United States Patent
Wang et al.

(10) Patent No.: US 9,619,454 B2
(45) Date of Patent: Apr. 11, 2017

(54) METHOD FOR CONTROLLING ELECTRONIC SPREADSHEET ON HANDHELD TOUCH DEVICE

(71) Applicants: ZHUHAI KINGSOFT OFFICE SOFTWARE CO., LTD., Zhuhai (CN); ZHUHAI KINGSOFT SOFTWARE CO., LTD., Zhuhai (CN)

(72) Inventors: Dong Wang, Zhuhai (CN); Wei Zhao, Zhuhai (CN); Zhiyu Li, Zhuhai (CN)

(73) Assignees: ZHUHAI KINGSOFT SOFTWARE CO., LTD, Zhuhai (CN); ZHUHAI KINGSOFT OFFICE SOFTWARE CO., LTD, Zhuhai (CN)

( * ) Notice: Subject to any disclaimer, the term of this patent is extended or adjusted under 35 U.S.C. 154(b) by 28 days.

(21) Appl. No.: 14/356,765

(22) PCT Filed: Nov. 8, 2012

(86) PCT No.: PCT/CN2012/084315
§ 371 (c)(1),
(2) Date: May 7, 2014

(87) PCT Pub. No.: WO2013/071837
PCT Pub. Date: May 23, 2013

(65) Prior Publication Data
US 2014/0289601 A1    Sep. 25, 2014

(30) Foreign Application Priority Data
Nov. 18, 2011  (CN) .......................... 2011 1 0367375

(51) Int. Cl.
*G06F 17/00* (2006.01)
*G06F 17/24* (2006.01)
*G06F 3/0488* (2013.01)

(52) U.S. Cl.
CPC ........ *G06F 17/246* (2013.01); *G06F 3/04883* (2013.01); *G06F 3/04886* (2013.01)

(58) Field of Classification Search
CPC ............................. G06F 17/246; G06F 3/0488
See application file for complete search history.

(56) References Cited

U.S. PATENT DOCUMENTS

| 6,016,502 A | 1/2000 | Haneda et al. |
| 6,055,548 A * | 4/2000 | Comer .................. G06F 17/246 715/212 |

(Continued)

FOREIGN PATENT DOCUMENTS

| CN | 1790259 A | 6/2006 |
| CN | 102156614 A | 8/2011 |
| CN | 102566901 A | 7/2012 |

OTHER PUBLICATIONS

International Search Report for PCT/CN2012/084135 dated Jan. 31, 2013, 2 pages.

(Continued)

*Primary Examiner* — Scott Baderman
*Assistant Examiner* — Benjamin J Smith
(74) *Attorney, Agent, or Firm* — Patterson & Sheridan, LLP

(57) ABSTRACT

The present invention relates to a method for controlling an electronic spreadsheet on a handheld touch device, comprising an operation procedure, a display procedure and a recovery procedure. The operation procedure comprises: receiving a selection touch control signal for selecting cells, determining selected cells in an electronic spreadsheet according to the selection touch control signal, calculating according to a preset processing method, and storing the calculation result. The display procedure comprises: receiving a first touch control signal for controlling movement of an electronic spreadsheet from an initial position of the (Continued)

electronic spreadsheet to an interim position, moving the electronic spreadsheet from the initial position of the electronic spreadsheet to the interim position according to the first touch control signal to expose a blank area, querying whether the calculation result exists or not, and if yes, displaying the calculation result in the blank area. The recovery procedure comprises: receiving a second touch control signal for controlling movement of the electronic spreadsheet from the interim position to the initial position of the electronic spreadsheet, and moving the electronic spreadsheet to the initial position of the electronic spreadsheet according to the second touch control signal to cover the blank area. The calculation result can be displayed clearly by using the method, thereby facilitating use by users.

7 Claims, 5 Drawing Sheets

(56) References Cited

U.S. PATENT DOCUMENTS

| | | | | |
|---|---|---|---|---|
| 7,676,767 | B2* | 3/2010 | Hofmeister | G06F 3/0483 345/173 |
| 2006/0282818 | A1* | 12/2006 | DeSpain | G06F 17/246 717/109 |
| 2006/0284852 | A1* | 12/2006 | Hofmeister | G06F 3/0483 345/173 |
| 2009/0044091 | A1* | 2/2009 | Gur | G06F 17/246 715/212 |
| 2009/0313567 | A1* | 12/2009 | Kwon | G06F 3/0482 715/769 |
| 2010/0083086 | A1* | 4/2010 | Berger | G06F 17/246 715/213 |
| 2010/0281374 | A1 | 11/2010 | Schulz et al. | |
| 2011/0078560 | A1* | 3/2011 | Weeldreyer | G06F 17/214 715/255 |
| 2012/0260152 | A1* | 10/2012 | Shimizu | G06F 3/04883 715/217 |
| 2013/0061122 | A1* | 3/2013 | Sethi | G06F 3/0482 715/217 |
| 2013/0067306 | A1* | 3/2013 | Bhargav | G06F 17/246 715/220 |
| 2013/0104020 | A1* | 4/2013 | Patterson | G06F 17/246 715/219 |
| 2014/0372952 | A1* | 12/2014 | Otero | G06F 17/246 715/835 |
| 2015/0113378 | A1* | 4/2015 | Otero | G06F 17/246 715/219 |
| 2015/0169530 | A1* | 6/2015 | Otero | G06F 17/246 715/219 |

OTHER PUBLICATIONS

Android webpage with translation dated Nov. 11, 2011.
Canadian Office Action for Application No. 2,850,982; dated Jul. 7, 2016; 4 total pages.

* cited by examiner

METHOD FOR CONTROLLING ELECTRONIC SPREADSHEET ON HANDHELD TOUCH DEVICE

FIELD OF THE INVENTION

The present invention relates to a method for controlling an electronic spreadsheet on a handheld touch device.

BACKGROUND OF THE INVENTION

An electronic spreadsheet contains cells having values, and mathematical operations such as summations and averaging can be performed with the values of multiple cells. Electronic spreadsheet software on a personal computer (PC), e.g., Office Excel, implements a method which automatically conducts calculating operations once the data of multiple cells are selected by a mouse and displays the result on the status bar. However, when adapted to a handheld touch device (the user can control the use of the device by touching the touchscreen of the device, e.g., iPhone 3, iPhone 4, HTC G11, HTC G14), due to the screen size of the device, some functions of the existing electronic spreadsheet software have been omitted and the above convenient function for user is not available.

SUMMARY OF THE INVENTION

A technical problem to be solved by the present invention is to provide a method for controlling an electronic spreadsheet on a handheld touch device, which can clearly display a calculation result, thereby facilitating the use by the user.

The above technical problem is solved by the following technical solution.

A method for controlling an electronic spreadsheet on a handheld touch device is provided, including:

calculation process: receiving a selection touch signal for selecting cells, selecting the cells in the electronic spreadsheet according to the selection touch signal, calculating based on a preset processing method, and storing a calculation result;

display process: receiving a first touch signal for moving the electronic spreadsheet from an initial position to an interim position, moving the electronic spreadsheet from the initial position to the interim position according to the first touch signal to display an blank area, and querying whether the calculation result exists and if so, displaying the calculation result in the blank area;

recovery process: receiving a second touch signal for moving the electronic spreadsheet from the interim position back to the initial position, and moving the electronic spreadsheet back to the initial position according to the second touch signal so that the electronic spreadsheet covers the blank area.

The display process can further include: when the blank area is displayed and the calculation result exists, receiving a third touch signal for directing any one calculation result to an unused cell, and displaying the calculation result in the unused cell according to the third touch signal.

The first touch signal for moving the electronic spreadsheet from the initial position to the interim position can be generated by holding a location on the touchscreen that corresponds to the electronic spreadsheet and moving to a place outside the blank area. The second touch signal for moving the electronic spreadsheet from the interim position to the initial position can be generated by holding a location on the touchscreen that corresponds to the electronic spreadsheet and moving towards or away from the blank area.

Moving the electronic spreadsheet between the initial position and the interim position can be implemented in a way that a moving function button for controlling the moving of the electronic spreadsheet between the initial position and the interim position by tapping it is provided on the electronic spreadsheet.

The moving function button can show a downwards sign when the electronic spreadsheet is in the initial position, and the moving function button can show an upwards sign when the electronic spreadsheet is in the interim position.

As can be seen from the above technical solution, the present invention displays a calculation result by moving the electronic spreadsheet away to display an blank area according to touch signals, which can clearly display the calculation result, thereby facilitating the use by the user.

BRIEF DESCRIPTION OF THE DRAWINGS

FIG. 2 to FIG. 8 are schematic diagrams illustrating operations on the electronic spreadsheet.

DETAILED DESCRIPTION OF THE EMBODIMENTS

Embodiment I

A method for controlling an electronic spreadsheet on a handheld touch device is provided, including:

calculation process: receiving a selection touch signal for selecting cells, selecting the cells in the electronic spreadsheet according to the selection touch signal, calculating based on a preset processing method, and storing a calculation result;

display process: receiving a first touch signal for moving the electronic spreadsheet from an initial position to an interim position, moving the electronic spreadsheet from the initial position to the interim position according to the first touch signal to display an blank area, and querying whether the calculation result exists and if so, displaying the calculation result in the blank area;

recovery process: receiving a second touch signal for moving the electronic spreadsheet from the interim position back to the initial position, and moving the electronic spreadsheet back to the initial position according to the second touch signal so that the electronic spreadsheet covers the blank area.

The display process can further include, when the blank area is displayed and the calculation result exists, receiving a third touch signal for moving any element of the calculation result to an unused cell, and displaying the element of the calculation result in the unused cell.

The first touch signal for moving the electronic spreadsheet from an initial position to an interim position can be generated by holding a location on the touchscreen that corresponds to the electronic spreadsheet and moving to a place outside the blank area. The second touch signal for moving the electronic spreadsheet from the interim position to the initial position can be generated by holding a location on the touchscreen that corresponds to the electronic spreadsheet and moving towards or away from the blank area.

Figure 1:
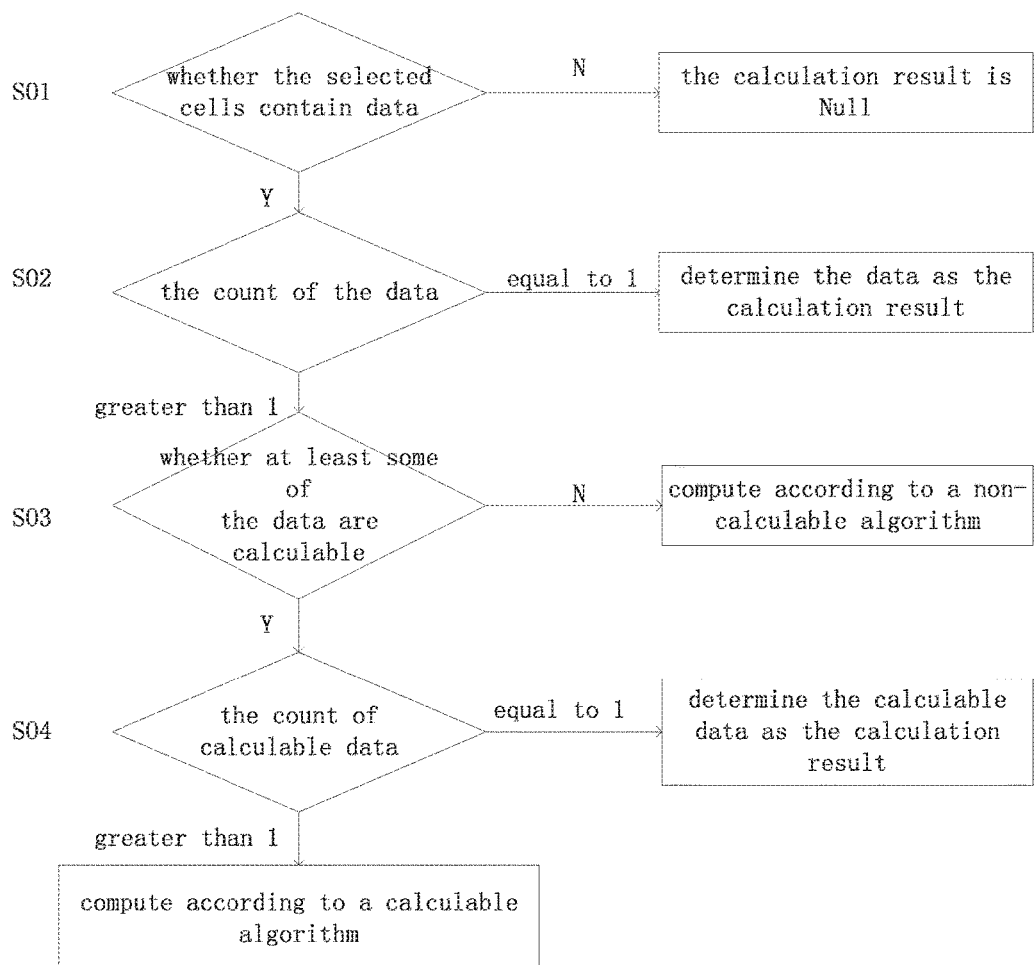
FIG. 1 is a flowchart illustrating a processing method in a calculation process.

As shown in FIG. 1, the processing method in the calculation process can include:

S01: determining whether the selected cells contain data and if no, the calculation result is Null; if so, proceeding to S02;

S02: determining the count of the data and if the count is 1, determining the data as the calculation result; if the count is greater than 1, proceeding to S03;

S03: determining whether at least some of the data are calculable and if no, computing with the data according to a non-calculable algorithm; if so, proceeding to S04;

S04: determining the count of calculable data and if the count is 1, determining the calculable data as the calculation result; if the count is greater than 1, proceeding to S05;

S05: computing with the calculable data according to a calculable algorithm.

Specifically, the non-calculable algorithm in step S03 is to compute the count of the selected cells.

The calculable algorithm in step S05 can include computing the count of the calculable data, the maximum and minimum value of the data, the average of the data, the sum of the data.

Figures 2, 3:
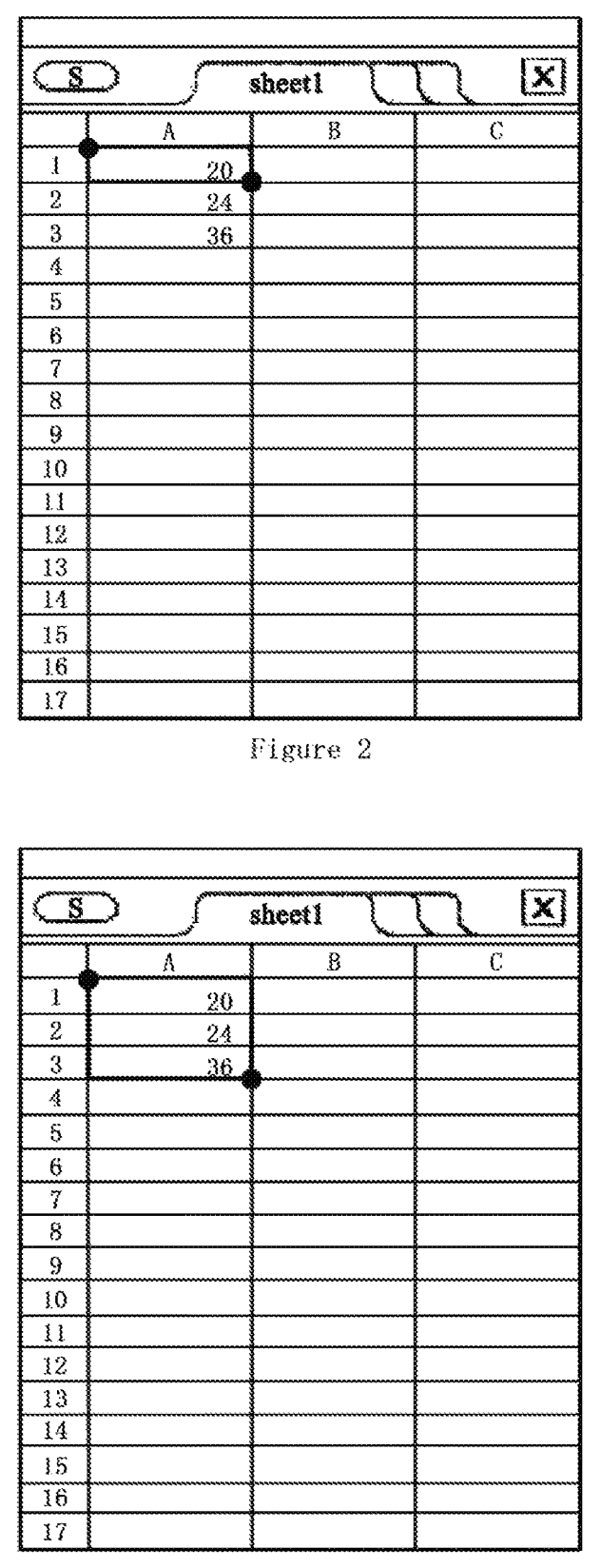

As shown in FIGS. 2 to 6, in an example, the present invention is applied to control the handheld touch device on which an electronic spreadsheet is operated:

In FIG. 2, an electronic spreadsheet is opened on a handheld touch device, and the electronic spreadsheet is in an initial position.

In FIG. 3, cells A1-A3 are selected by inputting a selection touch signal through the touchscreen, and the handheld touch device performs calculation according to the selection touch signal based on a preset processing method and stores the calculation result.

Figure 4:
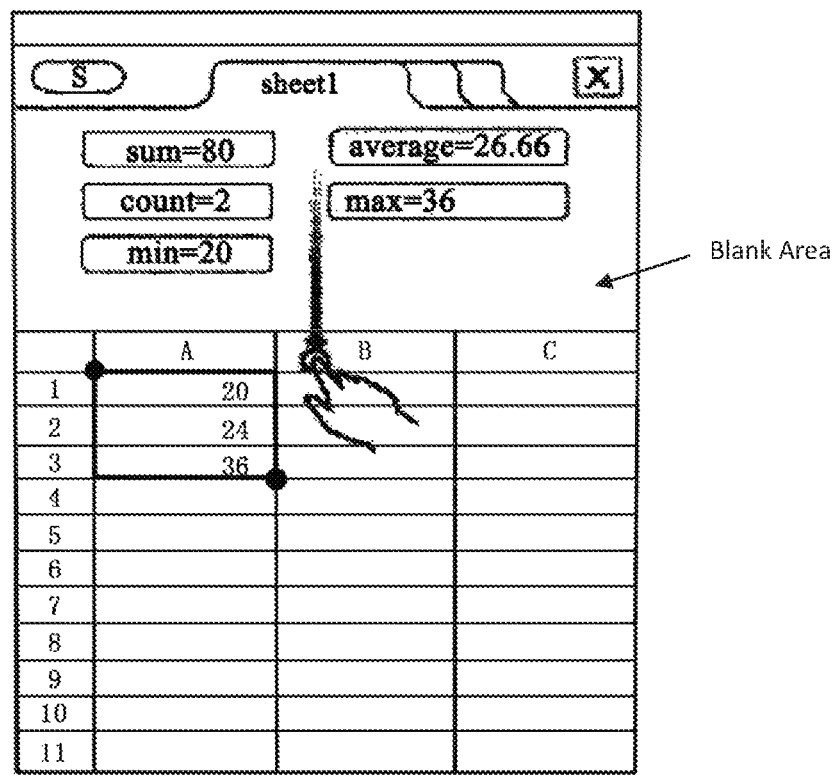

As shown in FIG. 4, the user inputs a first touch signal, which includes holding a location on the touchscreen that corresponds to the electronic spreadsheet (specifically in this example the location held can correspond to the title of the electronic spreadsheet) and moving downwards to a place outside a blank area. The handheld touch device moves the electronic spreadsheet downwards to an interim position according to the first touch signal, to display the blank area where the following data are displayed: sum=80, avg=26.666, count=3, min=20, max=36.

Figure 5:
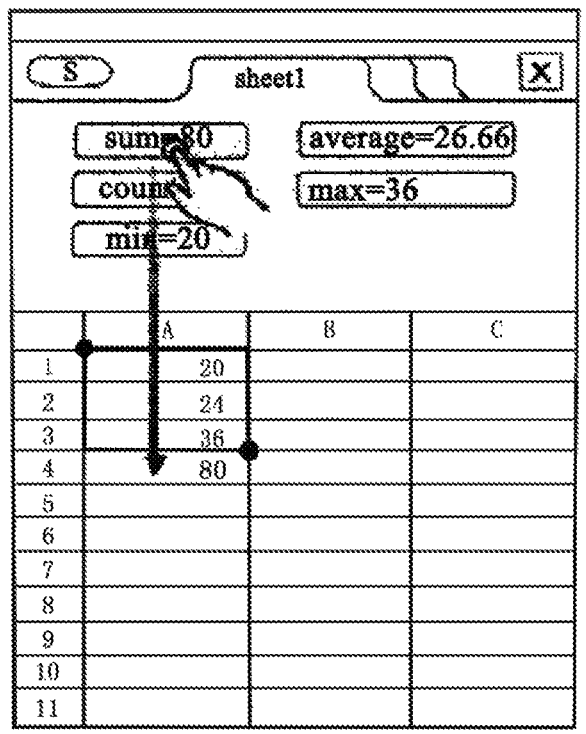

As show in FIG. 5, the user inputs a third touch signal, which includes holding a location on the touchscreen that corresponds to sum=80 and moving to a location that corresponds to cell A4. The handheld touch device displays 80 in cell A4 according to the third touch signal.

Figure 6:
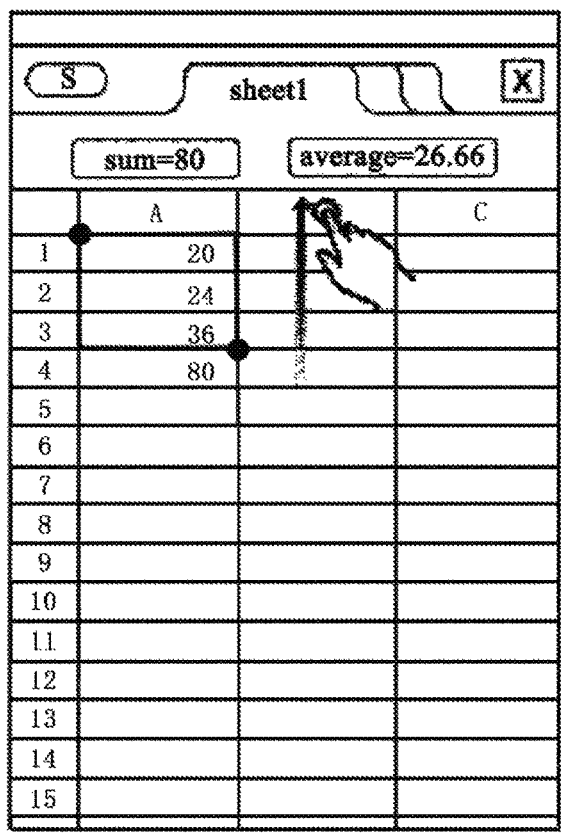

As shown in FIG. 6, the user inputs a second touch signal, which includes holding a location on the touchscreen that corresponds to the title of the electronic spreadsheet and moving upwards (i.e., towards the blank area). The handheld touch device moves the electronic spreadsheet to the initial position according to the second touch signal so that the electronic spreadsheet covers the blank area.

Embodiment II

The present embodiment provides another method for moving the electronic spreadsheet between the initial position and the interim position, which can be used in conjunction with the corresponding one in Embodiment I, or as an alternative of it.

Figure 7:
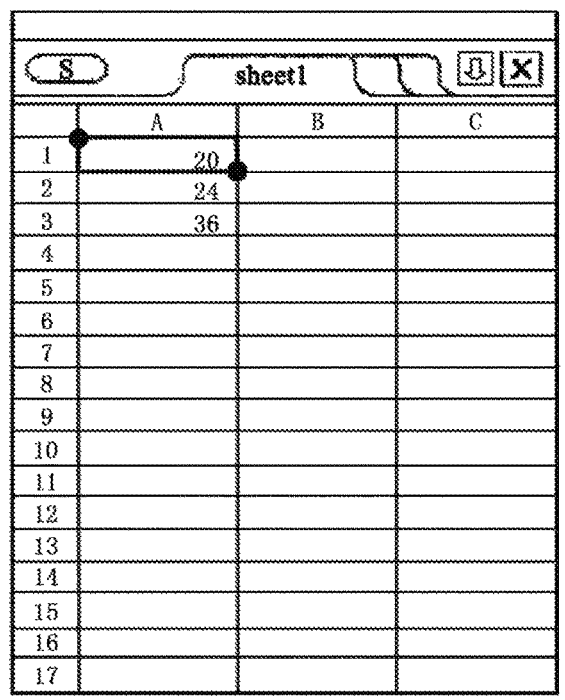
Figure 8:
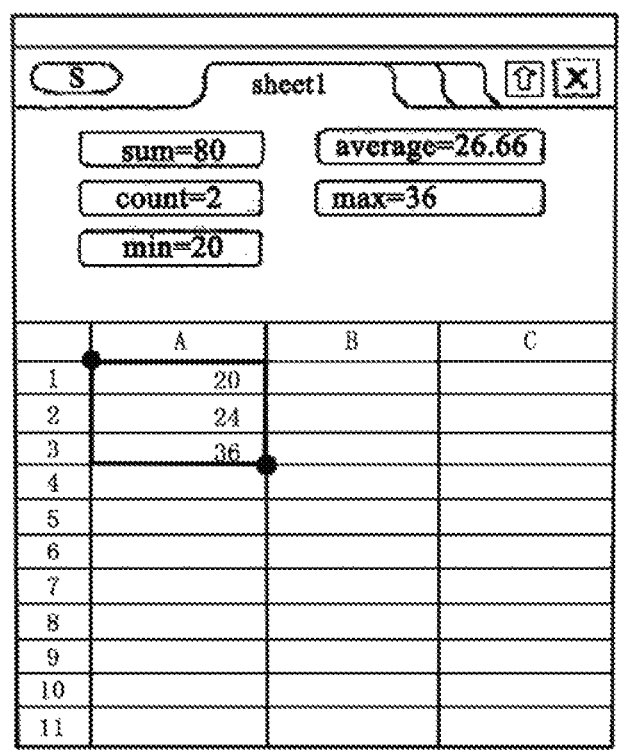

As shown in FIG. 7 and in FIG. 8, a moving function button for controlling the moving of the electronic spreadsheet between the initial position and the interim position is provided on the right top of the spreadsheets. The user can tap on the moving function button such that the electronic spreadsheet can move between the initial position and the interim position. The moving function button shows a downwards sign when the electronic spreadsheet is in the initial position, and the moving function button shows an upwards sign when the electronic spreadsheet is in the interim position.

Moving the electronic spreadsheet between the initial position and the interim position can be implemented by providing a moving function button for controlling the moving of the electronic spreadsheet between the initial position and the interim position by tapping it on the electronic spreadsheet. Both the first and second touch signals can be generated by tapping a location on the touchscreen that corresponds to the moving function button. For visualization and convenience purposes, the following design can be employed. The moving function button shows a downwards sign when the electronic spreadsheet is in the initial position, and the moving function button shows an upwards sign when the electronic spreadsheet is in the interim position.

The present invention is not limited by the above embodiments. Those equivalents that are made based on the embodiments herein without inventive effort shall fall within the scope of the invention.

The invention claimed is:

1. A method for controlling an electronic spreadsheet on a handheld touch device, comprising:

calculation process: receiving a selection touch signal for selecting cells, selecting the cells in the electronic spreadsheet according to the selection touch signal, performing calculation based on a preset processing method, and storing a calculation result;

display process: receiving a first touch signal for moving the electronic spreadsheet from an initial position to an interim position, moving the electronic spreadsheet from the initial position to the interim position according to the first touch signal to display an blank area, and querying whether the calculation result exists and if so, displaying the calculation result in the blank area;

recovery process: receiving a second touch signal for moving the electronic spreadsheet from the interim position back to the initial position, and moving the electronic spreadsheet back to the initial position according to the second touch signal so that the electronic spreadsheet covers the blank area, wherein, the preset processing method in the calculation process includes:

Step one: determining whether the selected cells contain data and if no, the calculation result is Null; if so, proceeding to Step two;

Step two: determining the count of the data and if the count is 1, determining the data as the calculation result; if the count is greater than 1, proceeding to Step three;

Step three: determining whether at least some of the data are calculable and if no, computing with the data according to a non-calculable algorithm; if so, proceeding to Step four;

Step four: determining the count of calculable data and if the count is 1, determining the calculable data as the calculation result; if the count is greater than 1, proceeding to Step five;

Step five: computing with the calculable data according to a calculable algorithm.

2. The method for controlling an electronic spreadsheet on a handheld touch device according to claim 1, wherein the display process further comprises:

when the blank area is displayed and the calculation result exists, receiving a third touch signal for directing any one calculation result to an unused cell, and displaying the calculation result in the unused cell according to the third touch signal.

3. The method for controlling an electronic spreadsheet on a handheld touch device according to claim 1, wherein the first touch signal for moving the electronic spreadsheet from an initial position to an interim position is generated by holding a location on the touchscreen that corresponds to the electronic spreadsheet and moving to a place outside the blank area;

the second touch signal for moving the electronic spreadsheet from the interim position to the initial position is generated by holding a location on the touchscreen that corresponds to the electronic spreadsheet and moving towards or away from the blank area.

4. The method for controlling an electronic spreadsheet on a handheld touch device according to claim 1, wherein moving the electronic spreadsheet between the initial position and the interim position is implemented by providing a moving function button for controlling the moving of the electronic spreadsheet between the initial position and the interim position by tapping it on the electronic spreadsheet.

5. The method for controlling an electronic spreadsheet on a handheld touch device according to claim 4, wherein the moving function button shows a downwards sign when the electronic spreadsheet is in the initial position, and the moving function button shows an upwards sign when the electronic spreadsheet is in the interim position.

6. The method for controlling an electronic spreadsheet on a handheld touch device according to claim 1, wherein the non-calculable algorithm of Step three is to compute the count of the selected cells.

7. The method for controlling an electronic spreadsheet on a handheld touch device according to claim 1, wherein the calculable algorithm of Step five includes computing the count of the calculable data, the maximum and minimum value of the data, the average of the data and the sum of the data.

* * * * *